May 23, 1933. T. ZUSCHLAG 1,910,418
DETERMINATION OF ELECTRICAL CHARACTERISTICS OF ELECTRICAL CONDUCTORS

Filed March 31, 1931 3 Sheets-Sheet 1

INVENTOR
THEODOR ZUSCHLAG
BY
ATTORNEYS

Fig. 4.

Patented May 23, 1933

1,910,418

UNITED STATES PATENT OFFICE

THEODOR ZUSCHLAG, OF ENGLEWOOD, NEW JERSEY, ASSIGNOR TO SWEDISH AMERICAN PROSPECTING CORPORATION, OF NEW YORK, N. Y., A CORPORATION OF NEW YORK

DETERMINATION OF ELECTRICAL CHARACTERISTICS OF ELECTRICAL CONDUCTORS

Application filed March 31, 1931. Serial No. 526,748.

This invention relates to the determination of electrical characteristics of electrical conductors, and has for its object certain improvements in the method of and apparatus for determining electrical characteristics of electrical conductors. The invention relates more particularly to the determination of potential drops across electrical conductors, or of the resistances of electrical conductors. The invention also contemplates improvements in the determination of potential drop ratios, and of resistance ratios.

Various proposals have been advanced, a few of which are commonly employed, to determine electrical characteristics of electrical conductors of numerous kinds. For example, the well known Wheatstone bridge is employed to make simple resistance measurements. The Kelvin bridge is employed where greater accuracy in the determination of low resistance is desired. The use of these bridges is often limited because of unknown and varying contact resistances encountered when determining the electrical characteristics of conductors. No satisfactory proposal appears yet to have been advanced to overcome inaccuracies due to these contact resistances, except to restrict the use of the bridges to cases where the contact resistances met are of a negligible nature. There is therefore a distinct need for better means with which to determine the electrical characteristics of conductors or conducting bodies.

In my copending application Serial No. 516,143, filed February 16, 1931, I have disclosed and claimed a method of and apparatus for determining electrical characteristics of electrical conductors which avoid errors due to contact resistances and the like. As pointed out in said copending application, the invention described may be said to solve electrically the problem expressed in mathematical terms:

$$(1) \quad x = \frac{y+A}{z+B} = \frac{y+C}{z+D}$$

in which $x$, $y$ and $z$ are three unknown quantities, that may include contact resistances and the like; and A, B, C and D are known or ascertainable quantities, that may include standard or calibrated resistances and the like. The numerical value of $x$ is solvable from this equation, the solution of which is given by the equation:

$$(2) \quad x = \frac{C-A}{D-B}$$

Assuming that $y$ and $z$, for example, include contact resistances, it will be observed that the unknown quantity $x$ can be determined from the known quantities.

The apparatus more particularly contemplated in my aforementioned copending application comprises two parallel circuits, divided by a common indicator branch; a reference conductor connectable in series with an electrical conductor to be investigated; the two parallel circuits being connectable in bridge relationship with the reference conductor and the conductor to be investigated. A reversible switch, or equivalent means, is provided in the two parallel circuits. In operating this apparatus, the method more particularly contemplated comprises the steps of utilizing a current flow through the conductor connected in series with the reference conductor, also shunting a part of the current flow through the two parallel circuits in bridge relationship with the conductor and reference conductor; then balancing the two parallel circuits in regard to their current flow by altering the value of resistance in at least one of the circuits; and balancing the bridge by changing the value of resistance in at least one of the circuits, and then re-establishing a balanced condition of the bridge by adjusting the value of another resistance in at least one of the circuits.

As a result of my investigations, I have discovered other improvements in a method of and apparatus for determining electrical characteristics of electrical conductors; which may involve the determination of potential drops and of resistances, as well as of potential drop and resistance ratios, that for the most part avoid the difficulties or inaccuracies encountered when using the well known measuring devices; and that, likewise, do not require the use of two parallel circuits provided with a common indicator branch, as is more particularly contemplated in my copending application above referred to. In fact, the circuits herein contemplated need not have any common connection whatever.

In accordance with my improvements, the desired determinations in the investigation of electrical characteristics of conductors may be made in such a way as to avoid contact, as well as instrument, resistances now encountered in the devices normally employed, and which prove highly troublesome. The apparatus contemplated is simple in construction, relatively cheap materials may be employed; and it may be operated readily and quickly. My improved apparatus is particularly well suited for the investigation of the electrical characteristics of conductors or conducting bodies not immediately connected with each other, but which are located or connectable at different places; such, for example, as in the determination of electrical characteristics of electrolytes.

The present invention contemplates a balancing net-work that permits the determination of potential drop ratios or of resistance ratios, while simultaneously eliminating contact and internal resistance effects. This highly desirable result may be accomplished with the apparatus herein contemplated, and by the method especially involved, according to which the unknown potential drop or unknown resistance ratio is measured with different bridge ratio combinations. Thus, a current flow through the conductor or conducting body to be investigated is utilized, the conductor being connected in series with a reference conductor. A part of the current flow is shunted through two balancing circuits connected with the conductor and reference conductor.

Various procedures may be followed in the practice of the invention, depending for the most part on the particular determination that is to be made. In some instances, for example, it may be desired merely to determine an unknown resistance. In other cases, it may be desirable to make a potential drop determination across a certain electrical conductor. Situations may arise where a specific unknown resistance or potential drop is not separately determinable, but in which an exceedingly valuable ratio relationship may be determined as between that resistance or potential drop and another unknown resistance or potential drop. Both the method and apparatus contemplated are sufficiently flexible to permit ready application to a variety of practical situations.

In order better to understand the present invention reference may be made to the attached drawings, taken in conjunction with the following description, in which.

Figure 1:
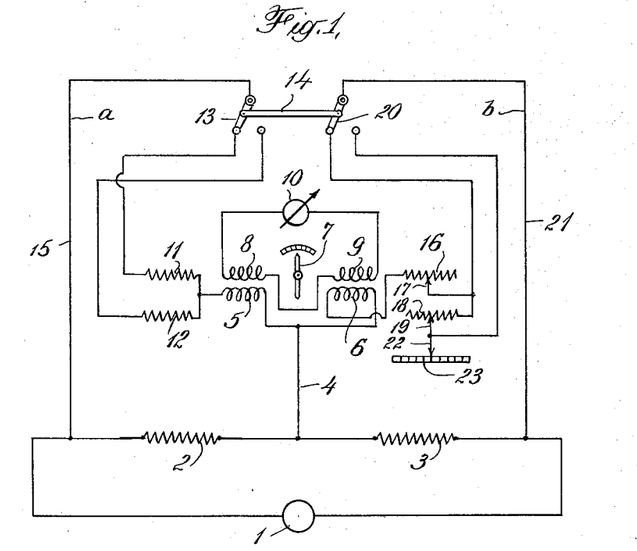
Fig. 1 is a diagrammatic representation of an apparatus for investigating electrical characteristics of two immediately connected or connectable conductors.

Referring for the moment more particularly to Fig. 1, a bridge net-work is shown consisting of two balancing circuits $a$ and $b$. A current source 1 is connected in series to an unknown resistance 2 and to a known, ascertainable or calibrated resistance 3. Appropriate terminals, electrodes, contacts or the like are employed to connect the source of current with the electrical conductor or resistance to be investigated. The terminals are conveniently and advantageously located at the ends of the leads coming from the current source.

The common ends of the two resistances are connected by a common lead 4 to the common ends of two electrically identical differential coils 5 and 6. These coils are in a reverse position one to the other so that their resultant electromagnetic fields are opposed to each other; either in regard to a moving indicator element 7 or in regard to two electrically identical secondary windings 8 and 9, which are connected in series with a suitable current indicator or current responsive means 10. This current indicator may be of a conventional type, such as a galvanometer, telephone or the like. In case the signals received by the current indicator are too weak, they may of course be suitably amplified by means not shown; but which are well known as applicable in such cases. In the first case, the combination 5, 6 and 7 acts as a differential galvanometer. In the second case, the combination 5, 6, 8, 9 and 10 acts as a differential transformer.

The free end of the differential coil 5 is connected to the common ends of two fixed resistances 11 and 12, the free ends of which may be connected alternatively to the outer end of the unknown resistance 2 by means of a pole 13 of a double-pole double-throw switch 14 and a lead 15.

The free end of the reversed differential coil 6 is connected in series with a variable resistance 16; a moving contact arm or slider 17 of which is connected in series with a variable resistance 18 having a moving contact arm or slider 19. The two sliders 17 and 19 may be connected alternatively to the outer end of the known, ascertainable or calibrated resistance 3 by means of suitable leads each in series with a pole 20 of the double-pole double-throw switch 14; and a lead 21.

The moving contact arm or slider 19, operating on the variable resistance 18, is provided with a pointer 22 which indicates its relative position upon a suitably graduated scale 23; from which appropriate readings may be taken. The variable resistance 18 is built in such a manner that any increase or decrease in resistances, while moving contact slider 19, occurs in straight line proportion. Each scale division on scale 23, therefore, represents a constant amount of ohmic resistance.

Figure 2:
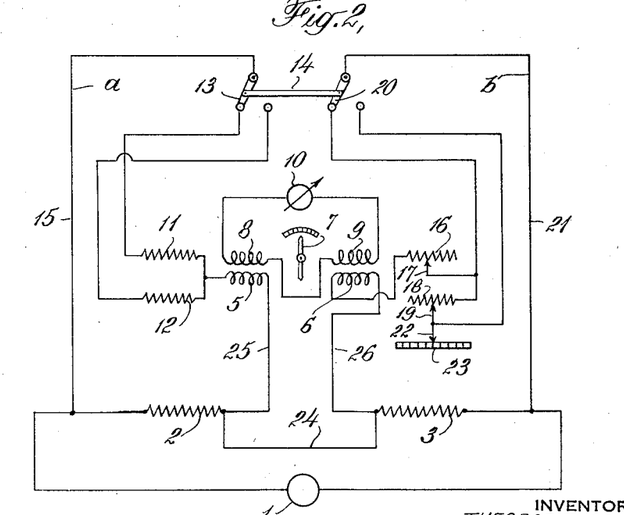
Fig. 2 is a diagrammatic representation of a modified form of appparatus for investigating two conductors not immediately connected or connectable.
Figure 3:
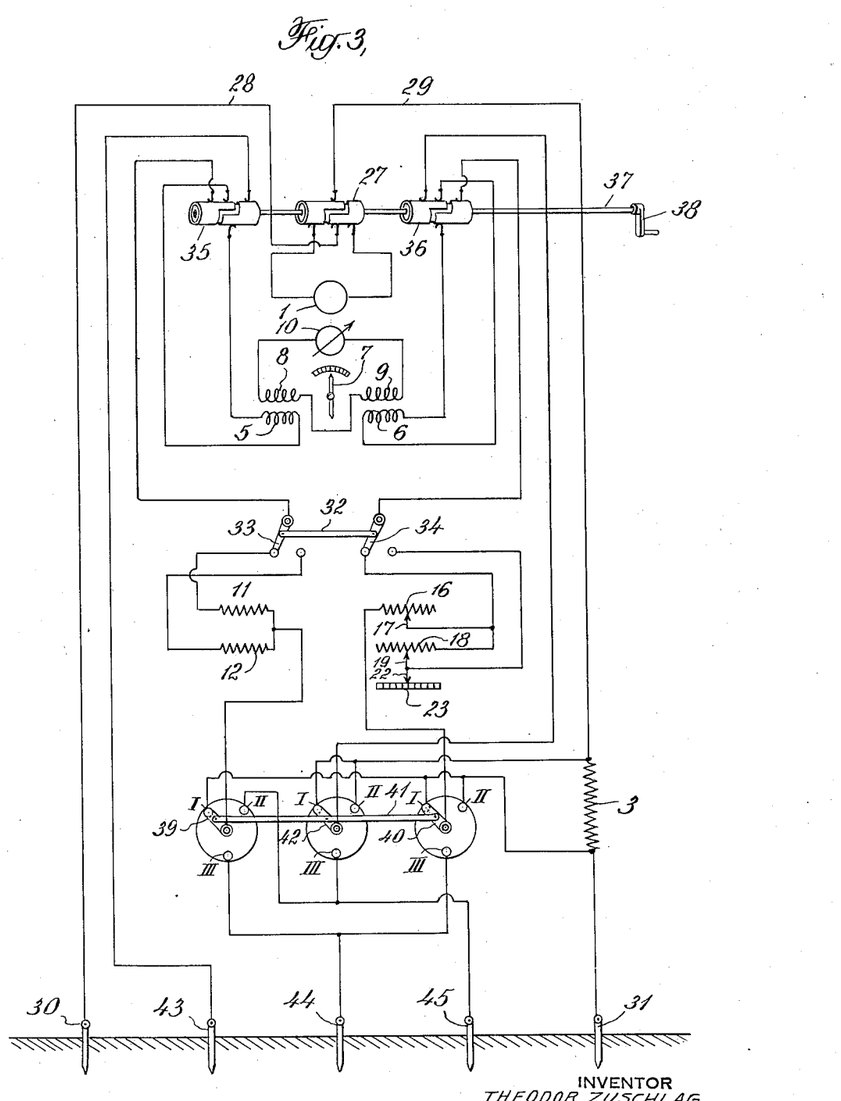
Fig. 3 is a diagrammatic representation of an apparatus particularly adapted for the investigation of ground resistance or ground resistivity conditions; or similar phenomena.
Figure 4:
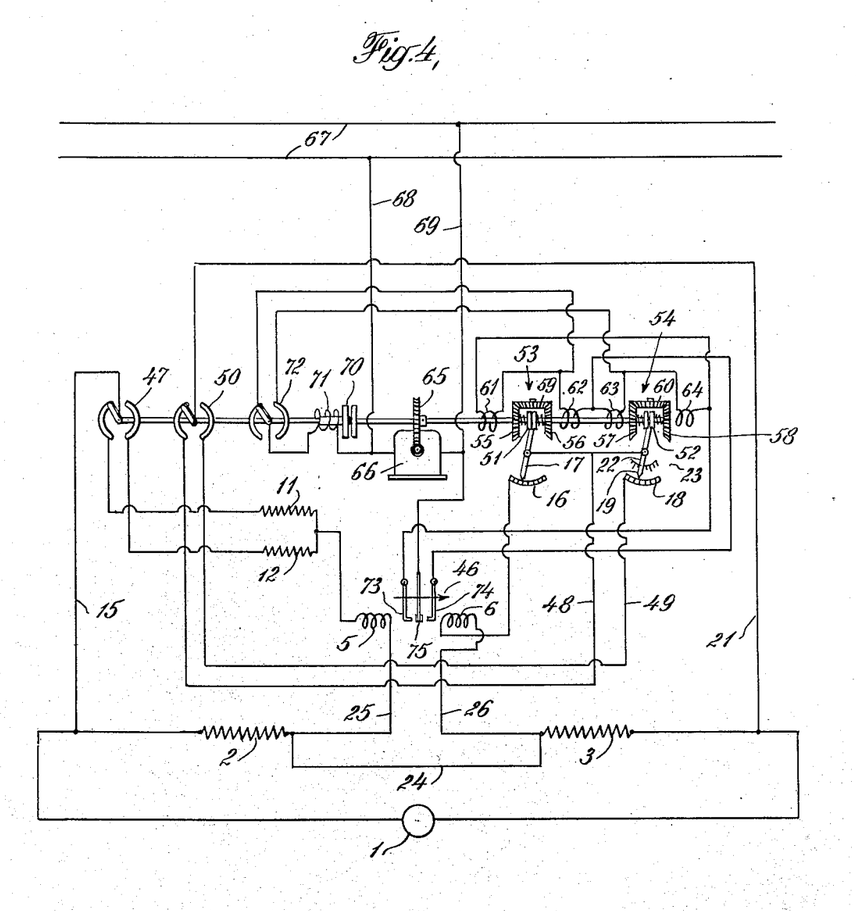
Fig. 4 is a diagrammatic representation of an apparatus for investigating electrical characteristics of conductors, which apparatus may be automatically operated for recording and/or controlling purposes.

Before going on to a detailed discussion of Figs. 2, 3 and 4, it may be well first to consider the operation of the apparatus shown in Fig. 1, while at the same time setting out and developing a few of the pertinent formulæ and ratios employable in a practice of the invention.

Assuming that an electrical conductor 2 is under investigation, the leads coming from the source of current 1 are appropriately brought in contact therewith; a convenient arrangement being, for example, diagrammatically illustrated in Fig. 1. In practical operation, the set-up would depend largely on the circumstances involved, such as the type of conductor or conducting body to be investigated; and the manner in which the current can be made to pass through it.

With the fixed resistance 11 cut into circuit $a$, as shown in Fig. 1, this resistance is connected in series with the pole 13 of the double-pole double-throw switch 14; which is connected in series with the lead 15. The lead 15 is in turn connected in series with the unknown resistance 2. The same position of the double-pole double-throw switch places the variable resistance 16 into the circuit $b$. In this case, the variable resistance 16 is connected in series with the pole 20; which is in turn connected in series with the lead 21. The lead 21 is connected in series with the known or calibrated resistance 3. It may be noted that neither fixed resistance 12, nor variable resistance 18 will be cut into circuits $a$ and $b$ in this case.

Current coming from the source 1 in part passes through the unknown resistance 2 and the known resistance 3, while a part of the current is shunted through the circuits $a$ and $b$. As is to be expected, the bridge net-work will ordinarily be out of balance. The circuits are then balanced by suitably adjusting the variable resistance 16 by means of its moving contact arm or slider 17. The resultant value of resistance, $R_{16}$, may then be noted. As will be seen below, the actual notation of the value $R_{16}$ may ultimately be ignored.

The operation just described may further be analyzed: Remittent currents $i_5$ and $i_6$, flowing through the two electrically identical differential coils 5 and 6, will differ in strength, ordinarily, and thereby cause a deflection either of the moving indicator element 7 of the differential galvanometer; or of the current indicator 10 of the differential transformer. This deflection of the indicator may be balanced or neutralized by adjusting the moving contact arm or slider 17 on the variable resistance 16. The adjusted variable resistance is not disturbed for the next operation.

Since the two differential coils 5 and 6 are electrically identical, the balancing of the deflection by one or the other of the indicators 7 and 10 indicates that the two currents $i_5$ and $i_6$ have the same strength; and that, therefore, no current is flowing through the common lead 4; because $i_5$ and $i_6$ are flowing in opposite directions in this lead, and because currents $i_2$ and $i_3$, flowing through the unknown resistance 2 and the known resistance 3, are of identical strength.

Assuming that R and $i$, and appropriate sub numeral indexes, indicate the numerical value of resistances and current flow corresponding to similarly numerically indexed instrument parts, the following equations obtain in accordance with Ohm's law:

(3) $\quad i_2 R_2 = i_5 (R_{15} + R_{11} + R_5)$ (4) $\quad i_3 R_3 = i_6 (R_{21} + R_{16} + R_6)$ in which $R_2$ = the resistance of the conductor 2;
$R_3$ = the resistance of the known or calibrated resistance 3;
$R_5$ = the resistance of the differential coil 5;
$R_6$ = the resistance of the differential coil 6;
$R_{11}$ = the resistance of the fixed resistance 11;
$R_{16}$ = the resistance of the contact and lead or internal instrument resistance indicated by the numeral 16;
$R_{15}$ = the resistance of the contact and lead or internal instrument resistance indicated by the numeral 15;
$R_{21}$ = the resistance of the contact and lead or internal instrument resistance indicated by the numeral 21;
$i_2$ = the current flowing through the unknown resistance 2;
$i_3$ = the current flowing through the known or calibrated resistance 3;
$i_5$ = the current flowing through the differential coil 5; and
$i_6$ = the current flowing through the differential coil 6.

On combining Equations (3) and (4), and keeping in mind that currents $i_2$ and $i_3$ are of identical strength; and that currents $i_5$ and $i_6$ are likewise of identical strength, the following equation obtains:

$$(5) \quad \frac{R_2}{R_3} = \frac{R_{15} + R_{11} + R_5}{R_{21} R_{16} R_6}$$

Next, the double-pole double-throw switch 14 is reversed. This operates to cut the fixed resistance 12 in series with the circuit $a$; and to cut the variable resistance 18 in series with the circuit $b$. As before, the network will be out of balance due to differences in current flow. The circuits are then balanced by suitably adjusting the variable resistance 18 by means of the moving contact arm or slider 19; leaving the adjusted value of resistance 16 from the previous operation untouched. The resultant value of resistance $R_{18}$ is then noted. Following the procedure outlined above, in the statement and development of Equations (3) and (4), the following equations likewise obtain in accordance with Ohm's law:

$$(6) \quad i'_2 R_2 = i'_5 (R_{15} + R_{12} + R_5)$$

$$(7) \quad i'_3 R_3 = i'_6 (R_{21} + R_{18} + R_{16} + R_6)$$

in which $R_{12}$ = the resistance of the fixed resistance 12;
$R_{18}$ = the resistance of the variable resistance 18;
$i'_2$ = the current flowing through the unknown resistance 2;
$i'_3$ = the current flowing through the known or calibrated resistance 3;
$i'_5$ = the current flowing through the differential coil 5; and
$i'_6$ = the current flowing through the differential coil 6.

On combining Equations (6) and (7), and keeping in mind that currents $i'_2$ and $i'_3$ are of identical strength, and that currents $i'_5$ and $i'_6$ are likewise of identical strength, the following equation obtains:

$$(8) \quad \frac{R_2}{R_3} = \frac{R_{15} + R_{12} + R_5}{R_{21} + R_{18} + R_{16} + R_6}$$

A study of Equations (5) and (8) will show that they correspond to the hypothetical Equation (1) first set out above:

For purposes of ready comparison, the unknown quantities $x$, $y$ and $z$ of Equation (1) may be written as follows, in equations formed to correspond with their equivalents in Equations (5) and (8);

$$(9) \quad x = \frac{R_2}{R_3}$$

$$(10) \quad y = R_{15} + R_5$$

$$(11) \quad z = R_{21} + R_{16} + R_6$$

Continuing the same method of comparison, the known quantities A, B, C and D of Equation (1) may be written as follows to correspond with their equivalents in Equations (5) and (8):

$$(12) \quad A = R_{11}$$

$$(13) \quad B = 0$$

$$(14) \quad C = R_{12}$$

$$(15) \quad D = R_{18}$$

Substituting the equivalents of $x$, $y$ and $z$ of Equations (9), (10) and (11) and the equivalents of A, B, C and D of Equations (12), (13), (14), and (15) in Equation (1), the following results:

$$(16) \quad \frac{R_2}{R_3} = \frac{(R_{15} + R_5) + R_{11}}{(R_{21} + R_{16} + R_6) + 0} = \frac{(R_{15} + R_5) + R_{12}}{(R_{21} + R_{16} + R_6) + R_{18}}$$

The same result may of course be obtained by suitably combining Equations (5) and (8).

In order to reduce the ratio $\frac{R_2}{R_3}$ to its simplest terms, and to make that ratio or its equivalent readable directly from the instrument, Equation (16) may be rewritten in the form of Equation (2); or Equations (5) and (8) may be combined and developed to give the same result; namely:

$$\frac{R_2}{R_3} = \frac{R_{12} - R_{11}}{R_{18}}$$

In case Equations (5) and (8) are to be combined and developed, the following steps may be considered:

Developing Equation (5) with regard to $R_{21}$, it may be rewritten:

$$(17) \quad R_{21} = \frac{R_3}{R_2}(R_{15} + R_{11} + R_5) - R_{16} - R_6$$

And, developing Equation (8) with regard to $R_{21}$, it may be rewritten:

$$(18) \quad R_{21} = \frac{R_3}{R_2}(R_{15} + R_{12} + R_5) - R_{18} - R_{16} - R_6$$

Substituting the value of $R_{21}$ in Equation (17) for $R_{21}$ in Equation (18), and developing in regard to the ratio $\frac{R_2}{R_3}$:

$$(19) \quad \frac{R_3}{R_2}(R_{15} + R_{11} + R_5) - R_{16} - R_6 = \frac{R_3}{R_2}(R_{15} + R_{12} + R_5) - R_{18} - R_{16} - R_6$$

$$(20) \quad \frac{R_3}{R_2}R_{15} + \frac{R_3}{R_2}R_{11} + \frac{R_3}{R_2}R_5 = \frac{R_3}{R_2}R_{15} + \frac{R_3}{R_2}R_{12} + \frac{R_3}{R_2}R_5 - R_{18}$$

$$(21) \quad \frac{R_3}{R_2}R_{11} = \frac{R_3}{R_2}R_{12} - R_{18}$$

$$(22) \quad \frac{R_3}{R_2}(R_{11} + R_{12}) = -R_{18}$$

$$(23) \quad \frac{R_2}{R_3} = \frac{R_{12} - R_{11}}{R_{18}}$$

In checking through the above equations, it will be seen that the differential coil resistances $R_5$ and $R_6$; the lead and contact or internal instrument resistances $R_{15}$ and $R_{21}$; as well as the variable resistance $R_{16}$ are eliminated. The net result is to obtain a true ratio between the unknown resistance $R_2$ and the known resistance $R_3$, namely $\frac{R_2}{R_3}$, in terms of a ratio between the change in resistance in shifting from fixed resistance $R_{11}$ to fixed resistance $R_{12}$ and the variable resistance $R_{18}$, namely $$\frac{R_{12}-R_{11}}{R_{18}}$$

Since variations of resistance 18 are in a straight line proportion, each scale division on scale 23 may be made to represent a certain amount of ohmic resistance. Advantage may be taken of this simple straight line relationship to determine numerically the ohmic value of the apparatus per scale division.

In order to determine the amount of ohmic resistance per scale division, the procedure for determining the instrument constant outlined in my above mentioned copending application, or any of the well known methods, may be followed. By the use of this constant, the ohmic value per scale division may be computed. It is evident from a consideration of Equation (23) that the scale 23 of the variable resistance 18 may be calibrated in terms of the true ratio $$\frac{R_2}{R_3}.$$

Equation (23) may be further simplified by solving for the value of $R_2$ in terms of the other quantities, all of which are known, or readily ascertainable in certain investigations:

(24) $\quad R_2 = \dfrac{R_3(R_{12}-R_{11})}{R_{18}}$

Practically the same arrangement illustrated in Fig. 1 may be used to compare the electrical characteristics of conductors which may not be considered as immediately connected, such as the resistance offered by an electrolyte between two electrodes immersed in a solution; or electrical characteristics of conductors that are located at different places. Referring to Fig. 2, the unknown resistance 2 is shown separated from the known, ascertainable or calibrated resistance 3 by a lead 24. Instead of employing a common branch, such as lead 4 of Fig. 1, the apparatus of Fig. 2 is provided with two separate leads 25 and 26, each of which is connected or connectable in series with the unknown resistance 2 and the known resistance 3, respectively. Such an arrangement completely separates the circuit 2, 15, 13, 11 (or 12), 5, 25; and the circuit 3, 21, 20, 16 (or 18, 16), 6, 26.

Proceeding in the same manner as described for the apparatus of Fig. 1, a deflection of either indicator 7 or 10 may be balanced by suitably moving the sliding contact arm 17 on the variable resistance 16; and, after reversal of switch 14 by suitably moving the sliding contact arm 19 on the variable resistance 18. In such case, the same conclusions may be drawn in regard to the effect of the balancing operation. That is, that the currents $i_5$ and $i_6$ as well as the currents $i_2$ and $i_3$ are of identical strength; and that the following equations obtain in accordance with Ohm's law:

(25) $\quad \dfrac{R_2}{R_3} = \dfrac{R_{15}+R_{11}+R_5+R_{25}}{R_{21}+R_{16}+R_6+R_{26}}$ and (26) $\quad \dfrac{R_2}{R_3} = \dfrac{R_{15}+R_{12}+R_5+R_{25}}{R_{21}+R_{18}+R_{16}+R_6+R_{26}}$ These equations, too, are of the same general type as that set out in Equation (1). Making the same substitution as before, but including $R_{25}$ and $R_{26}$ in the values of $y$ and $z$, and solving for $$\frac{R_2}{R_3},$$

Equation (23) results; thereby making it possible to use the same calibration of scale 23 in both cases. In other words, the resistances $R_{25}$ and $R_{26}$ are eliminated from the final results; as were $R_5$, $R_6$, $R_{15}$, $R_{16}$ and $R_{21}$ in the first case.

In this connection, it may be noted that in many instances, the value of resistance 11 may be kept at zero, 0, thereby making it possible to simplify Equation (23):

(27) $\quad \dfrac{R_2}{R_3} = \dfrac{R_{12}}{R_{18}}$

A practical combination of the arrangements shown in Figs. 1 and 2 for the purpose of making ground resistance and ground resistivity tests, such as those made in geophysical explorations, is illustrated in Fig. 3. The current source 1, which may consist of a suitable battery or hand driven generator, is connected in series with a rotating commutator 27, capable of reversing the direction of the current flow coming from the current source. Two outgoing commutator leads 28 and 29 are connected to grounded exciter or power electrodes 30 and 31, respectively; power electrode 31 being connected in series with the known, ascertainable or calibrated resistance 3.

As before, the measuring arrangement, or receiving net-work, includes two fixed resistances 11 and 12; and two variable resistances 16 and 18, with sliding contact arms 17 and 19, respectively. The fixed resistances 11 and 12 and sliding contact arms 17 and 19 of the variable resistances 16 and 18 are connected to a double-pole double-throw switch 32, having poles 33 and 34 which are connected in series with the electrically identical, but reversed, differential coils 5 and 6 of the differential galvanometer, or of the differential transformer, by means of rotating commutators 35 and 36, respectively. These coils are in a reversed position one to the other so that their resultant electromagnetic fields are opposed to each other, either in regard to a moving indicator element 7 or in regard to the two electrically identical secondary windings 8 and 9, which are connected in series with the current indicator or current responsive means 10. The commutators 35, 27 and 36 are mechanically coupled to a common axis 37, which may be rotated by means of a hand crank 38.

The common end of the fixed resistances 11 and 12 and one end of the variable resistance 16 are connected to two poles 39 and 40 of a triple-pole triple-throw switch 41, a pole 42 of which is connected to the free pole of the rotating commutator 36; while the free pole of the rotating commutator 35 is connected directly to a potential electrode 43. The contact points of switch 41 are connected to the ends of resistance 3 and to potential electrodes 44 and 45.

Thus, contact point I for pole 39; and contact points I and II for pole 40 connect one another and one end of resistance 3. Contact points I and II for pole 42 connect one another and the other end of resistance 3. Contact III for pole 39 and contact III for pole 40 connect one another and potential electrode 44. Contact II for pole 39 and contact III for pole 42 connect one another and potential electrode 45.

The purpose of the rotating commutators 27, 35 and 36 is the elimination of polarization effects when using a direct current indicating instrument. The reversal in direction of current flow caused by commutator 27 is neutralized by a second synchronous reversal in direction of current flow by means of commutators 35 and 36. It should here be pointed out that these commutators are only diagrammatically illustrated. As is well known to those skilled in this art, such commutators are adapted to reverse the direction of current flow in a combination such as that here contemplated. Other equivalent devices may of course be employed, such as a vibrating commutator, to obtain the same result.

The purpose of switch 41 is to effect easy rearrangement of the apparatus for different types of ground investigation. For example, when the poles 39, 42 and 40 of switch 41 are in position I, as shown in Fig. 3, the instrument may be used to determine the contact resistance of the power electrode 31. When current enters the ground by means of power electrode 31, it causes a pronounced potential drop between the electrode and the ground with which it contacts. As current leaves the power electrode, it spreads out in all directions; yet, the resultant potential drop due to the specific resistance of the ground is generally negligible compared with the contact potential drop at power electrode 31. The contact resistance at power electrode 31 may, therefore, be compared with the unknown resistance 2 of Fig. 1. The contact resistance at potential electrode 43 may be compared to the contact resistance, $R_{15}$, of lead 15 in Fig. 1.

Following the procedure more particularly outlined for the apparatus of Fig. 1, and with fixed resistance 11 cut into the circuit, as shown in Fig. 3, the current flow through the bridge network is balanced by suitably adjusting the moving contact arm or slider 17 on the variable resistance 16. This value of resistance 16 is not disturbed for the next operation. The current flow through the network is then unbalanced by cutting resistance 12 into the circuit; after which the current flow through the network is balanced by suitably adjusting the moving contact arm or slider 19 on the variable resistance 18.

As the contact resistance $R_{15}$ was eliminated in the development of the formulæ for Fig. 1, so is the contact resistance at potential electrode 43 eliminated. The net result, therefore, is to obtain the value of the true ratio $$\frac{R_{31}}{R_3}$$

as between the contact resistance of the power electrode 31 and the known or calibrated resistance $R_3$; the potential drop from power electrode 31 to potential electrode 43 being of negligible magnitude.

On changing the poles 39, 42 and 40 of switch 41 to position II, the instrument measures the potential drop $P_{43-45}$, from potential electrode 43 to potential electrode 45, in terms of a ratio of the potential drop $P_3$ across the known or standard resistance 3. In this case, the contact resistance at potential electrode 43, $R_{43}$, is again comparable to the resistance $R_{15}$ of lead 15 in Fig. 2; and the contact resistance at potential electrode 45 is comparable to the resistance $R_{25}$ of the lead 25 in Fig. 2. Also, the potential drop from potential electrode 43 to potential electrode 45 is comparable to the unknown resistance 2 of Fig. 2. The unbalanced circuits are balanced, unbalanced, and rebalanced as before. In the development of formulæ corresponding to those set out for Fig. 1, the values for $R_{43}$ and $R_{45}$ are ultimately eliminated. The value for the true ratio $$\frac{P_{43-45}}{P_3},$$

which is of considerable importance in ground resistivity investigations or generally in geoelectrical explorations, is given on the graduated scale 23.

Finally, when the poles 39, 40 and 42 of switch 41 are in position III, the instrument permits the determination of the potential drop ratio $$\frac{P_{45-44}}{P_{44-42}};$$

the value of which may likewise be read on graduated scale 23. This type of information is extensively used in geoelectrical investigations. In this case, the contact resistance $R_{43}$ of the potential electrode 43 again corresponds to the lead and contact resistance $R_{15}$ of Fig. 1. The contact resistance $R_{44}$ of potential electrode 44 corresponds to the resistance $R_4$ of lead 4 in Fig. 1; and the contact resistance $R_{45}$ of the potential electrode 45 corresponds to the lead and contact resistance $R_{21}$ of Fig. 1. Furthermore, the potential drop from potential electrode 43 to potential electrode 44 corresponds to the potential drop across the unknown resistance 2 of Fig. 1; and the potential drop from potential electrode 44 to potential electrode 45 corresponds to the potential drop across the known resistance 3 of Fig. 1. The unbalanced circuits are balanced, unbalanced and rebalanced as before. In the development of formulæ corresponding to those set out for Fig. 1, the values for $R_{43}$, $R_{44}$, and $R_{45}$ are ultimately eliminated. The value for the true potential drop ratio $$\frac{P_{45-44}}{P_{44-43}}$$

is given on the graduated scale 23.

In some cases, it may be desirable to make the measurements or determinations automatic. The apparatus shown in Figs. 1, 2 and 3 is more particularly adapted for manual operation, although in principle automatic features may be associated therewith. Automatic measurements are particularly desirable in cases where it is advantageous to obtain continuous or permanent records; or in which controls are to be effected automatically. An apparatus for conducting automatic determinations is diagrammatically illustrated in Fig. 4. Essentially the same principles and procedures employed with respect to the apparatus of Figs. 1, 2 and 3 are here likewise employed.

Referring to Fig. 4, it will be seen that the current source 1 is connected in series with the unknown resistance 2 and the known or calibrated resistance 3. The measuring circuit consists of the two fixed resistances 11 and 12, the common ends of which are connected to the differential coil 5 of a differential relay 46; and of the two variable resistances 16 and 18, the one end of resistance 16 being connected to the differential coil 6 of the differential relay 46. The free ends of differential coils 5 and 6 are directly connected to the unknown resistance 2 and to the known resistance 3 by means of leads 25 and 26, respectively. The free ends of the fixed resistances 11 and 12 are connected alternatively to the lead 15 in series with the unknown resistance 2 by means of a rotating two-position switch 47. The common point of the variable resistances 16 and 18, by means of lead 48, and the free end of the variable resistance 18, by means of lead 49, are connected alternatively to the known resistance 3 by means of a rotating two-position switch 50. Moving contact arms or sliders 17 and 19 on the variable resistances 16 and 18, respectively, are mechanically connected with coupling disks 51 and 52, respectively, of electromagnetic clutches 53 and 54, respectively.

The electromagnetic clutches 53 and 54 consist of gear and magnet disks 55, 56 and 57, 58 which are mechanically coupled and which rotate in opposite direction by means of gear wheels 59 and 60, and which are magnetically energized by coils 61, 62, 63 and 64, respectively.

The gears 55, 56, 57, 58, 59 and 60 are kept continuously rotating by means of a worm gear combination 65 driven by a constant speed motor 66. The motor 66 connects with a current feed line or supply system 67 by means of leads 68 and 69.

The worm gear 65 is further coupled to a normally engaged electromagnetic clutch 70, an energizing coil 71 of which is connected to one terminal of the current supply system 67 and the pole of a rotating two-position switch 72. The switch 72 is synchronously rotated with the switches 47 and 50, and alternatively connects the energizing coil 71 with the energizing coils 61 and 62; or 63 and 64. The common ends of coils 61 and 64 are connected to a contact 73 of the differential relay 46; and the common ends of coils 62 and 63 are connected to a contact 74; while a moving contact tongue 75 of the relay is connected to the other terminal of the current supply system 67.

The automatic operation of this arrangement is directed by the differential relay system 46. If either measuring circuit combination (11, 5 and 16, 6) or (12, 5 and 18, 16, 6) is not balanced in regard to current flow, then the contact tongue 75 of the relay 46 will touch either contact 73 or 74, depending on whether or not the current flowing through coil 5 is greater than that flowing through coil 6, and thereby energize coil 71 as well as coils 61, 62, 63 and 64. The energization of coil 71 disengages clutch 70 and stops the rotation of switches 47, 50 and 72. Assuming that switch 72 stopped in the position shown in Fig. 4 with fixed resistance 11 (but not with fixed resistance 12) and variable resistance 16 (but not variable resistance 18) cut into the circuits, and assuming further that the moving contact relay tongue 75 touches contact 73, then coil 61 will be fully energized, while coils 62, 63 and 64 are connected in series and therefore will be only partially energized. The greater energization of coil 61 pulls the coupling disk 51 against the magnet disk 55 and causes it to rotate with disk 55; thereby moving the slider 17 of the variable resistance 16 in the right direction until a balance is re-established. At this instant, moving contact relay tongue 75 moves back to a neutral position, and thereby interrupts the energization. Clutch 70 reengages the worm gear 65 by means of a suitable spring arrangement (not shown), thereby starting again the rotation of switches 47, 50 and 72. The coupling disk 51 is also returned to a neutral position by means of another spring arrangement, thereby stopping any further movement of the moving contact arm or slider 17 of the variable resistance 16.

Next, assuming that switch 72 stopped in the position shown in Fig. 4, with fixed resistance 11 (but not with fixed resistance 12) and variable resistance 16 (but not variable resistance 18) cut into the circuits; and assuming further that the moving contact relay tongue 75 touches contact 74, which will be the case when more current flows through coil 6 than through coil 5, then coil 62 will be fully energized, while coils 61, 63 and 64 will be only partially energized. The greater energization of coil 62 pulls the coupling disk 51 against the magnet disk 56 and causes it to rotate with disk 56; thereby moving the slider 17 of the variable resistance 16 in the right direction until a balance is re-established. At this instant, the moving contact relay tongue 75 moves back to a neutral position and thereby interrupts the energization. Clutch 70 reengages the worm gear 65 by means of its spring arrangement, thereby starting again the rotation of switches 47, 50 and 72. The coupling disk 51 is also returned to a neutral position by means of its spring arrangement thereby stopping any further movement of the moving contact arm or slider of the variable resistance 16.

In the two cases just considered, the fixed resistance 11 was cut into the circuit. Substantially the same form of analysis may be followed in considering what happens when the fixed resistance 12 is cut into the circuit. Assuming, therefore, that switch 72 stopped in a position opposite to that shown in Fig. 4, with fixed resistance 12 (but not with fixed resistance 11) and with both variable resistances 18 and 16 cut into the circuits; and assuming further that the moving contact relay tongue 75 touches contact 73, which is the case when the current flowing through coil 5 is greater than the current flowing through coil 6, then coil 64 will be fully energized, while coils 63, 62 and 61 will be only partially energized. The greater energization of coil 64 pulls coupling disk 52 against the magnet disk 58 and causes it to rotate with disk 58; thereby moving the slider 19 (the slider 19 and the pointer 22 may well constitute one and the same device in this particular construction) of the variable resistance 18 in the right direction until a balance is re-established. The value of resistance 16, on balancing the circuits with fixed resistance 11 cut therein, is not disturbed. At this instant, moving contact relay tongue 75 moves back to a neutral position, and thereby interrupts the energization. Clutch 70 again reenegages the worm gear 65 by means of its spring arrangement, thereby starting again the rotation of switches 47, 50 and 72. The coupling disk 52 is also returned to a neutral position by its spring arrangement, thereby stopping any further movement of the moving contact arm or slider 19 of the variable resistance 18.

Next, assuming that switch 72 stopped in a position opposite to that shown in Fig. 4, with fixed resistance 12 (but not fixed resistance 11) and with both variable resistances 18 and 16 cut into the circuits; and assuming further that the moving contact relay tongue touches contact 74, which will be the case when the current flowing through coil 6 exceeds that flowing through coil 5, then coil 63 will be fully energized while coils 64, 62 and 61 will be only partially energized. The greater energization of coil 63 pulls the coupling disk 52 against the magnet disk 57 and causes it to rotate with disk 57; thereby moving the slider 19 of the variable resistance 18 in the right direction until a balance is re-established. The value of resistance 16, on balancing the circuits with fixed resistance 11 cut therein, is not disturbed. At this instant, moving contact relay tongue 75 moves back to a neutral position, and thereby interrupts the energization. Clutch 70 reengages the worm gear 65 by means of its spring arrangement, thereby starting again the rotation of switches 47, 50 and 72. The coupling disk 52 is also returned to a neutral position by means of its spring arrangement, thereby stopping any further movement of the moving contact arm or slider 19 of the variable resistance 18.

It will be understood that the procedure just outlined is essentially equivalent to that described for the apparatus illustrated in Figs. 1, 2 and 3, in so far as two main steps are employed. That is to say, in the first step the circuits are balanced by obtaining a suitable resistance value of variable resistance 16. That adjusted resistance is retained for the next step; in which, after unbalancing the circuits, a balanced condition is obtained by adjusting the variable resistance 18. It is at the end of that second step, or balancing operation, that the final result is read from the graduated scale 23; or is suitably recorded.

The resultant position of the slider or moving contact arm 19 may be read on the graduated scale 23, which may be calibrated to the true ratio $$\frac{R_2}{R_3}$$

or any other suitable function. Slider 19 may also be mechanically or electromagnetically connected with a suitable recording or controlling device (not shown) and its movement utilized to record or control any suitable effects or reactions.

If the instrument illustrated in Fig. 4 is used only for measuring purposes, then the motor 66 may be replaced by a hand crank (not shown), and the current supply system 67 may be replaced by any suitable voltage source. On turning said crank the instrument will then automatically indicate the true ratio $$\frac{R_2}{R_3}$$

without requiring any other manual operation. Used in this manner, the instrument represents a direct reading zero device, which may be used for a variety of purposes beyond the scope of ordinary bridge measurements; even by men not particularly familiar with the art of electrical measurements. On the other hand, the motor driven arrangement may be used automatically to record and control electrical effects or reactions, even under the most difficult conditions.

I claim:

1. In a method of determining the electrical characteristics of an electrical conductor, the steps which comprise utilizing a current flow through the conductor connected in series with a reference conductor, shunting part of said current flow through two balancing circuits having no common branch but which are connected with said conductor and reference conductor, balancing the current flow through said two balancing circuits by adjusting the value of resistance in one of the circuits, unbalancing the two circuits by changing the value of resistance in the other of said two circuits to a fixed predetermined value, and then re-establishing a balanced condition of the two circuits by adjusting the value of another resistance which is calibrated in terms of the electrical characteristics of the conductor under investigation.

2. A method according to claim 1, in which the last balanced condition of the two circuits is established by adjusting the value of a second resistance in series with the adjusted and undisturbed resistance in the first of said circuits.

3. A method according to claim 1, in which the two circuits are unbalanced by cutting in a fixed resistance of arbitrary value in one of said circuits, and in which a balanced condition of the two circuits is re-established by adjusting the value of a second resistance in series with the adjusted and undisturbed resistance in the first of said circuits.

4. In a method of electrical prospecting the steps which comprise setting up and maintaining a current flow in a tract to be investigated in series with a reference conductor, shunting part of said current flowing through the ground into a balancing circuit, shunting another part of said current through the reference conductor into a second balancing circuit, balancing the current flow through said two balancing circuits by adjusting the value of resistance in one of the circuits to a fixed predetermined value, unbalancing the two circuits by changing the value of resistance in the other of said two circuits, and then re-establishing a balanced condition of the two circuits by adjusting the value of another resistance which is calibrated in terms of the electrical characteristics of the conductor under investigation.

5. In an apparatus for determining the electrical characteristics of an electrical conductor, the combination comprising a reference conductor connectable in series with an electrical conductor to be investigated, and two balancing circuits having no common branch but connectable with said conductor to be investigated and connecting said reference conductor, said two circuits being provided with a reversible switch and at least two variable resistances and one fixed resistance of predetermined value.

6. An apparatus for determining the electrical characteristics of an electrical conductor according to claim 5, in which the two variable resistances are connectable in series in one of the circuits.

7. An apparatus for determining the electrical characteristics of an electrical conductor according to claim 5, in which two fixed resistances are connectable in one of the circuits, said reversible switch being adapted to cut one or the other fixed resistance into the circuit.

8. An apparatus for determining the electrical characteristics of an electrical conductor according to claim 5, in which at least one fixed resistance is provided in one of the circuits, and in which the two variable resistances are connectable in series in the other of said circuits.

9. An apparatus for determining the electrical characteristics of an electrical conductor according to claim 5, in which two fixed resistances are connectable in one of the circuits, and in which the two variable resistances are connectable in series in the other of said circuits, said reversible switch being adapted in one position to cut in simultaneously one of said fixed resistances and one of said variable resistances and in another position to cut in simultaneously the other of said fixed resistances and both of said variable resistances.

10. An apparatus for determining the electrical characteristics of an electrical conductor according to claim 5, in which two electrically identical differential coils are provided in the circuits.

11. An apparatus for determining the electrical characteristics of an electrical conductor according to claim 5, in which two electrically identical differential coils are provided in the circuits, one coil being present in each circuit, said coils being in a reverse position one to the other so that their resultant electromagnetic fields are opposed to each other.

12. An apparatus for determining the electrical characteristics of an electrical conductor according to claim 5, in which a differential galvanometer is associated with said circuits.

13. An apparatus for determining the electrical characteristics of an electrical conductor according to claim 5, in which a differential transformer is associated with said circuits.

14. An apparatus for determining the electrical characteristics of an electrical conductor according to claim 5, in which two electrically identical differential coils are provided in the circuits, a differential galvanometer being associated with said coils.

15. An apparatus for determining the electrical characteristics of an electrical conductor according to claim 5, in which two electrically identical differential coils are provided in the circuits, a differential transformer being associated with said coils.

16. An apparatus for determining the electrical characteristics of an electrical conductor according to claim 5, in which two electrically identical differential coils are provided in the circuits, one coil being present in each circuit, said coils being in a reverse position one to the other so that their resultant electromagnetic fields are opposed to each other, a differential galvanometer being associated with said coils.

17. An apparatus for determining the electrical characteristics of an electrical conductor according to claim 5, in which two electrically identical differential coils are provided in the circuits, one coil being present in each circuit, said coils being in a reverse position one to the other so that their resultant electromagnetic fields are opposed to each other, a differential transformer being associated with said coils.

In testimony whereof I affix my signature.

THEODOR ZUSCHLAG.